March 27, 1962     W. J. BLAZEK ET AL     3,027,201
MASTER PIN FOR ARTICULATED TRACKS
Filed Dec. 8, 1959
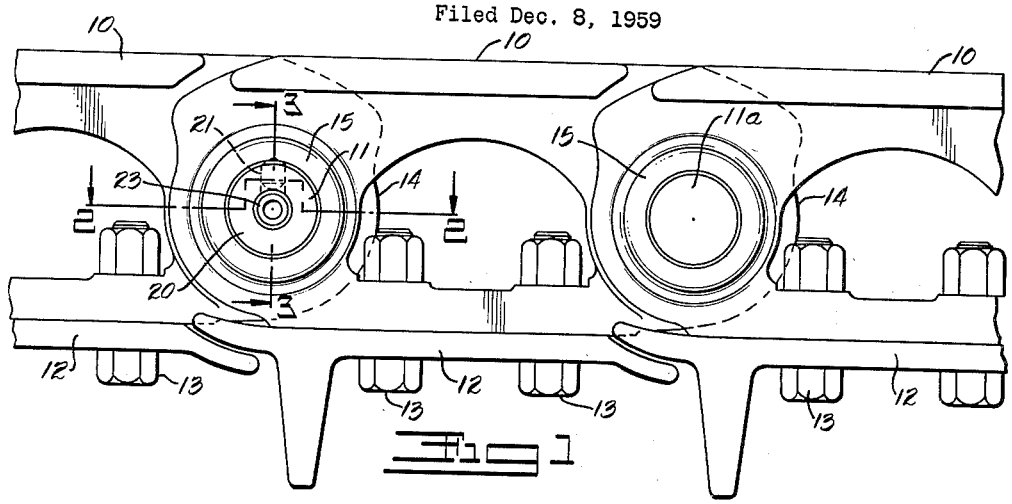
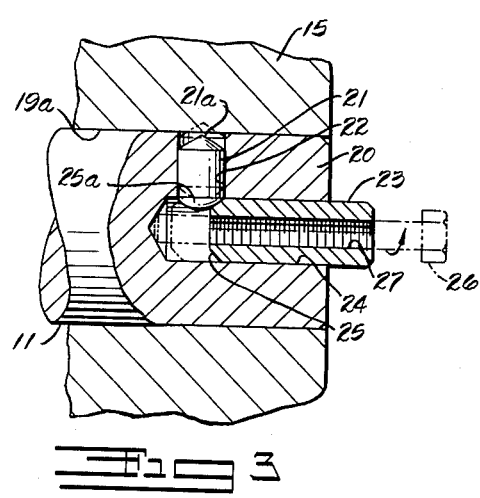
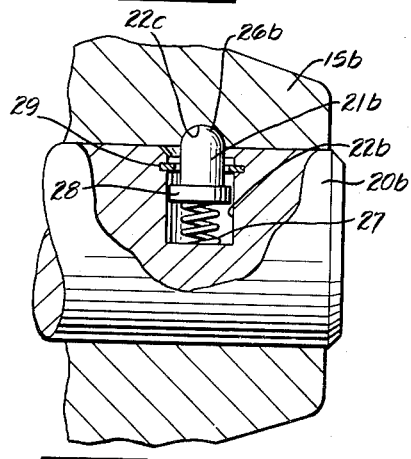
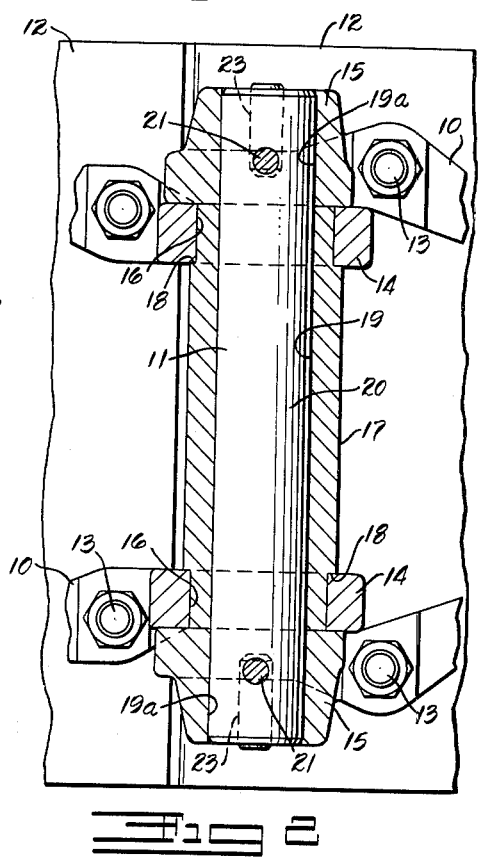
INVENTORS
WILLIAM J. BLAZEK
CHARLES REX BARKLEY
BY- MAHONEY, MILLER & RAMBO
BY-
ATTORNEYS.

3,027,201
MASTER PIN FOR ARTICULATED TRACKS
William J. Blazek and Charles Rex Barkley, New Lexington, Ohio, assignors to Lempco Products, Inc., Bedford, Ohio, a corporation of Ohio
Filed Dec. 8, 1959, Ser. No. 858,288
5 Claims. (Cl. 305—58)

This invention relates to a master pin for articulated tracks. It has to do, more particularly, with a removable master pin used in detachably connecting the ends of an articulated track or similar articulated devices, especially of the crawler type, so as to provide a continuous track.

It has been the practice in the past to provide a master pin for connecting the adjacent ends of a crawler type track to provide a continuous track structure for a vehicle. The pin is removable so that the ends of the track can be disconnected to permit removal of the track from the vehicle for repairs or replacement of parts. However, most prior art pins have been difficult to install and remove, usually requiring a driving force on the master pin for both operations.

It is the object of the present invention to provide an extremely simple master pin construction, composed of a minimum number of parts not subject to excessive wear, which is of an extremely rugged nature and will effectively pivotally connect adjacent links of the track without "play," and which can be installed and removed without applying a driving force to the master pin itself.

Another object of this invention is to provide a master pin which will be effectively locked in place after installation but can be removed with ease.

Various other objects will be apparent as this description progresses.

In the accompanying drawing, the master pin of this invention is shown applied to a vehicle track of the crawler type but it is to be understood that it is not limited specifically to the type of track shown.

In the drawing:

FIGURE 1 is a side elevational view of a track in which the master pin of this invention is incorporated.

FIGURE 2 is a horizontal sectional view taken along line 2—2 of FIGURE 1 and disclosing the present master pin.

FIGURE 3 is an enlarged, fragmentary, vertical sectional view taken along line 3—3 of FIGURE 1.

FIGURE 4 is a view similar to FIGURE 3 but illustrating a modification of the master pin.

With specific reference to the drawing, this invention is shown applied to a crawler-type track which includes double link structures 10 pivoted or hinged together by transverse pins 11a. The link structures 10 at the ends of the track are pivoted or hinged together by a master pin 11 to form a continuous track. The track includes the ground-engaging shoes 12 which are carried by the link structures 10, being bolted thereto by the bolts 13.

As shown in FIGURE 2, the double link structures 10 are of the usual form with the adjacent ends of their links overlapping each other. Thus, the inner links have their ends 14 disposed within the overlapping ends 15 on the adjacent outer links. The link ends 14 have the openings 16 extending therethrough transversely and these openings receive the outer reduced ends of a bushing and spacer 17. The bushing 17 has the spacing shoulders 18 engaging the inner surfaces of the link ends 14 and has its outer ends terminating flush with the outer surfaces of the link ends 14. The outer ends of the bushing 17 are usually non-rotatably secured within the openings 16, as by press-fitting. The bushing 17 has the pin-receiving opening or socket 19 extending completely therethrough. The ends 15 of the outer links are formed with relatively enlarged bosses having axially extending bores or eye openings 19a that are axially aligned with the bore or socket 19 in the bushing 17. Thus, when the inner and outer links have their ends 14 and 15 in properly overlapping relationship, a continuous pin-receiving socket is provided by the opening 19 of the bushing and the openings 19a of the outer set of links. This socket is adapted to receive the master connecting pin 20, and the bushing 17 and the inner set of links 10 are free to pivot about the pin 20 and relative to the outer set of links.

The master pin 20, throughout the major portion of its length, is preferably of solid cylindrical form and when properly positioned in the overlapping links, will terminate at the outer surfaces of the ends 15 of the outer set of links as shown in FIGURE 2. The pin 20 will snugly fit in the openings 19 and 19a but can be pushed axially into and out of such openings without a driving or pressed fit. Thus, the pin 20 will serve to pivotally or hingedly connect the adjacent overlapping ends of the inner and outer sets of links together so as to close or connect the ends of the track which carry them.

To lock the pin 20 in such position until it is desired to separate the ends of the track, at least one plunger 21 is provided at each end thereof. Each plunger 21 is mounted for sliding movement in a radial bore 22 formed in the master pin 20 adjacent its end but spaced inwardly thereof a distance less than the transverse extent of the opening or socket 19a in the link end 15. This locking plunger 21 is provided with a pointed or conical outer end 21a which is adapted to be forcibly projected radially into the wall of the socket or opening 19a.

For forcing or projecting the locking plunger 21 radially outwardly of the master pin 20 into the surface of the socket 19a, a wedge plug 23 is provided in a bore 24 which extends axially into the end of the master pin 20 slightly beyond the radial bore 22 and which communicates with the inner end of such bore 22. The plug 23 has a snug fit in the bore 24 so that the member 23 can be driven into the bore and will normally remain in its driven position.

The inner end of the plug 23 is provided with a tapered cam surface or wedge surface 25 for engaging with a tapered or spherical cam surface 25a on the inner end of the locking plunger 21. The plunger 21 is of such length that when its outer pointed end 21a is flush with the peripheral surface of the master pin 20, its inner end projects slightly into the bore 24 as shown by the full lines in FIGURE 3. This condition, illustrated by the full lines in FIGURE 3, is the condition of the parts when the master pin 20 is initially inserted through the bore of the bushing 17 and the eyes of the links 10 to connect the ends of the track links together.

After the master pin 20 is positioned in the socket, to connect the adjacent links and to close the track, each of the plugs 23 is driven inwardly of the bores 24, as indicated by the broken lines in FIGURE 3. This will cause inward movement of the wedge surface 25 thereof over the cam surface 25a of the plunger 21 radially and force the plunger 21 outwardly and cause the pointed end 21a to penetrate into the surface of the socket 19a. Thereafter, the master pin will be locked in place and will be precluded from moving axially out of the links which it pivotally connects and will be prevented from rotating in the sockets 19a. If desired, the wall of the socket 19a may be provided with a preformed shallow pocket properly located for receiving the end of the plunger 21.

When it is desired to disconnect the ends of the track, the master pin 20 must be removed. To unlock the master pin 20 for removal, means is provided for withdrawing the plug 23. This means comprises a bolt 26 which can be threaded through a threaded bore 27 extending axially completely through the plug 23. When the bolt 26 is screwed inwardly through the bore 27 of the plug 23 and into engagement with the inner end of the bore 24, as indicated by broken lines in FIGURE 3, the plug 23 will be forcibly backed out of the bore 24 to permit the locking plunger 21 to move radially inwardly into master pin releasing position, or back into the full line position of FIGURE 3 within the bore 22. After both locking plungers 21 are thus moved into releasing positions, the master pin 20 can be pushed axially out of its sockets to disconnect the adjacent link structures 10 and thereby open or disconnect the ends of the track.

In FIGURE 4, there is illustrated a modification of the retaining or locking plunger means for retaining the master pin 20b in position to pivotally connect the adjacent links to close the track. In this instance, the master pin 20b is provided with a radially extending bore or socket 22b adjacent its outer end which has a retaining plunger 21b mounted therein for radial movement. A compression spring 27 normally projects the plunger 21b radially outwardly, being disposed between the flanged inner end 28 of the plunger and the base of the socket or bore 22b. A collar or lock washer 29 is disposed within the outer end of the socket 22b and serves as a stop for cooperation with the flanged end 28 to limit outward movement of the plunger 21b by the spring 27. The outer end of the plunger 21b has a camming surface shown as a spherical surface 26b which will extend normally into a cooperating camming surface shown as a spherical pocket surface 22c formed in the adjacent link end 15b.

Normally, the master pin 20b will be retained by the outwardly pressed retaining plunger 21b and will be prevented from moving axially by such retaining plunger structure, it being understood that at least one of these structures is provided at each end of the master pin. However, to remove the master pin 20b, it is merely necessary to push on either end of the master pin and the complemental spherical camming surfaces 22b and 26b at the outer end of the retaining plungers 21b will serve to force the plungers inwardly to release the master pin 20b.

It will be apparent that there is provided according to this invention, a simple yet effective retaining means for retaining the master pin in position to hingedly connect the adjacent elements of an articulated track structure so as to close the track. The retaining means is such that the master pin can be moved axially readily into or out of connecting relationship with the adjacent links at the ends of the track. The master pin is normally retained in link connecting position by one or more radially movable retaining or locking plungers at each end thereof which normally is extended radially outwardly into a retaining or locking position. However, the master pin structure can be readily removed from its link connecting position, by radial retracting movement of the retaining or locking plunger.

Many advantages of the master pin structure of this invention have been discussed above and others will be apparent.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. In combination with a crawler vehicle track having inner and outer sets of links formed with relatively overlapping axially aligned eyes; a master pin for detachably and hingedly connecting said sets of links comprising an elongated cylindrical body extending axially through the eyes of said sets of links and formed a distance inwardly from each end thereof with a radially outwardly opening passage, said body being axially slidable within the eyes of said links to a position at which the radially outwardly opening passages thereof are within the confines of the eyes of the outer set of links; a plurality of locking plungers positioned respectively in the passages of said body and movable therein between radially retracted and extended positions with respect to the peripheral surface of said body; and means in said body engageable with said plungers to force the same into their radially extended positions and into non-rotative locking engagement with the eye-forming surfaces of the outer set of links.

2. The combination defined in claim 1, wherein said body is formed at each end thereof with an outwardly opening bore extending axially inwardly of said body in intersecting relation to one of said radially outwardly opening passages, and wherein said last-named means comprises a plurality of plugs having tapered leading ends and adapted respectively to be driven axially into the bores of said body to engage said locking plungers and to force said plungers to their radially extended positions.

3. The combination defined in claim 2, wherein each of said plugs is formed with a screw-threaded passage extending axially therethrough and adapted to receive a threaded back-out bolt.

4. A master pin for detachably and hingedly connecting the relatively interfitting end links of a crawler vehicle track comprising an elongated cylindrical body adapted to extend through the relatively interfitting end links of such track, and formed a distance inwardly from each end thereof with a radial bore opening to the periphery of said body, said body also being formed at each end thereof with an axial passage extending axially inwardly of said body and communicating with one of the radial bores formed therein; a locking plunger slidably carried in each of the radial bores of said body and movable therein between radially extended and retracted positions with respect to the peripheral surface of said body, said plunger having an inner cam surface adjacent the axial passage of said body; and a pair of plug members removably carried respectively in the axial passages of said body for axial movement therein and having leading ends engageable with the inner cam surfaces of said locking plungers to move the latter to their radially extended positions.

5. A master pin as defined in claim 4, wherein each of said plug members is formed with a screw-threaded passage extending axially therethrough for the reception of a threaded back-out bolt.

References Cited in the file of this patent

UNITED STATES PATENTS

| | | |
|---|---|---|
| 1,336,876 | Wickersham | Apr. 13, 1920 |
| 2,065,508 | Barnes | Dec. 29, 1936 |
| 2,749,763 | Rollins | June 12, 1956 |
| 2,780,830 | Kammerer | Feb. 12, 1957 |
| 2,802,368 | Rollins | Aug. 13, 1957 |
| 2,893,788 | Yerian | July 7, 1959 |

FOREIGN PATENTS

| | | |
|---|---|---|
| 324,767 | Italy | Feb. 15, 1935 |